Sept. 19, 1967 W. J. KUDLATY 3,342,332

FILTER

Filed April 10, 1964

INVENTOR.
Walter J. Kudlaty,
BY Parker & Carter
Attorneys.

United States Patent Office 3,342,332
Patented Sept. 19, 1967

3,342,332
FILTER
Walter J. Kudlaty, Elmhurst, Ill., assignor to Marvel Engineering Company, Chicago, Ill., a corporation of Illinois
Filed Apr. 10, 1964, Ser. No. 358,761
5 Claims. (Cl. 210—90)

ABSTRACT OF THE DISCLOSURE

A filter assembly wherein a filter housing has an open end and a filter cartridge is positioned in the housing, a closure for the open end and having an inner extending sleeve carried by spaced legs, a by-pass valve being carried in the sleeve and a rod attached to the valve and extending through the closure, the closure carrying an external indicator for indicating the position of the by-pass valve and thus the condition of the filter element, a spring being carried externally of and by the closure urges the by-pass valve into its closed position and the indicator means into its "clean-filter" indicating position.

---

This invention relates to filters and has particular relation to a filter having condition-indicating mechanism associated therewith and operable thereby.

An object of this invention is to provide a filter having a simplified indicating mechanism operable in response to conditions within the filter.

Another object is to provide an indicating filter of maximum compactness, simplicity and economy.

Another object is to provide a dual-filtration structure enabling the economical discard of filter elements.

Another object is to provide an indicating filter placeable in either right-to-left or left-to-right position adjacent a wall surface without modification of the filter.

Another object is to provide a filter assembly including an element effective simultaneously to by-pass a filter element and to indicate the condition within the filter.

Another object is to provide a filter assembly effective to provide indication of a changed condition immediately upon occurrence of such change, to provide such indication at the filter location or at a remote location, or both, and, when desired, to actuate equipment shutdown mechanism immediately upon occurrence of such condition.

Another object is to provide a filter having a simplified mechanical indicating mechanism.

Another object is to provide a filter having a simplified indicating mechanism which may produce both a mechanical and an electrical indication.

Another object is to provide a filter and indicator therefor effective to display a pre-existing condition.

Another object is to provide a filter having a simplified means for installation and replacement of elements therein.

Another object is to provide a filter having a by-pass valve effective additionally to provide an indication externally of said housing upon activation of said valve.

Another object is to provide a filter having a by-pass valve operable in response to a predetermined level of contamination in said filter and to produce, upon said activation, an external indication of the condition of said filter.

Other objects will appear from time to time during the course of the specification and claims.

The invention is illustrated more or less diagrammatically in the accompanying drawings, wherein.

Like parts are indicated by like numerals throughout the specification and drawings.

Figure 1:
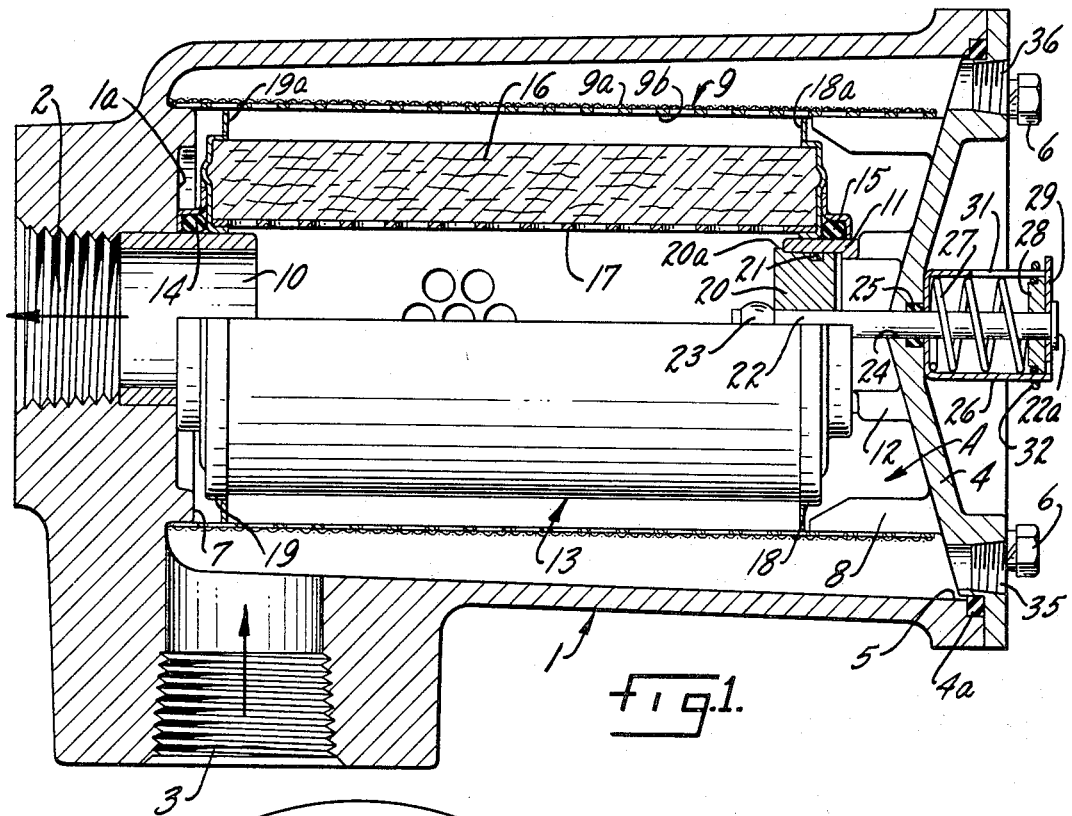
FIGURE 1 is a side elevation in partial cross section.

Referring now to the drawings, and particularly to FIGURE 1, the numeral 1 designates generally a filter housing. The filter housing has an outlet 2 at one end thereof and an inlet 3 positioned as shown in FIGURE 1 adjacent outlet 2. The inlet 3 communicates with an area A within housing 1. A cover plate or cap 4 is secured to the open end 5 of housing 1 by any suitable attachment means such as the fasteners 6 illustrated in FIGURE 2 and a suitable seal, such as at 4a is provided.

Within the chamber A in housing 1 an annular flange 7 extends inwardly from the end wall 1a of housing 1 and surrounds the outlet 2. The cap 4 carries inwardly extending spaced leg elements 8. A tubular filter member 9, including layers 9a, 9b of differential mesh, is carried by flange 7 and legs 8, the wall 9 defining a first stage of the dual filter assembly described herein. The member 9 is of constant diameter, insuring correct assembly.

A boss or sleeve 10 extends inwardly into chamber A from outlet 2 and a similar boss or sleeve 11 is carried by circumferentially spaced legs 12 extending inwardly from cap 4. The spaced, axially aligned sleeves 10, 11 receive on their equi-diametered outer surfaces a filter cartridge 13. The cartridge 13 carries seals 14, 15 for engagement with the outer surfaces of either of the sleeves 10, 11, the opposite end structures of filter 13 being substantially identical to guarantee correct insertion. The filter 13 includes an annular filtering structure 16 surrounding a hollow core 17, the core 17 being in communication with the sleeve 10, and through the sleeve 10, with outlet 2, the annular filtering structure 16 being inwardly spaced from the tubular wall 9 and being carried by end caps 18, 19 of filter element 13. Annular flanges 18a, 19a are carried by caps 18, 19.

Positioned for sliding sealing engagement with the inner surface of sleeve 11 is a by-pass valve element 20. The valve element 20 carries a seal 21 in engagement with the inner surface of sleeve 11 and an annular flange 20a for engagement with the end edge of sleeve 11 to limit the penetration of sleeve 11 by valve 20. A valve rod 22 extends through valve 20 and carries an enlargement or abutment 23 for engagement with the inner surface of valve 20 within the core 17 of filter element 13. Rod 22 extends through a central aperture 24 cap 4 in engagement with a seal 25 carried by cap 4. Beyond the cap 4, rod 22 extends through an indicator and spring retainer housing 26. The housing 26 could be formed integrally with cap 4 without departing from the nature and scope of the invention. A spring 27 is positioned in housing 26 and urges an abutment plate 28 and an indicator member 29 against an outer head 22a carried by rod 22.

Figure 2:
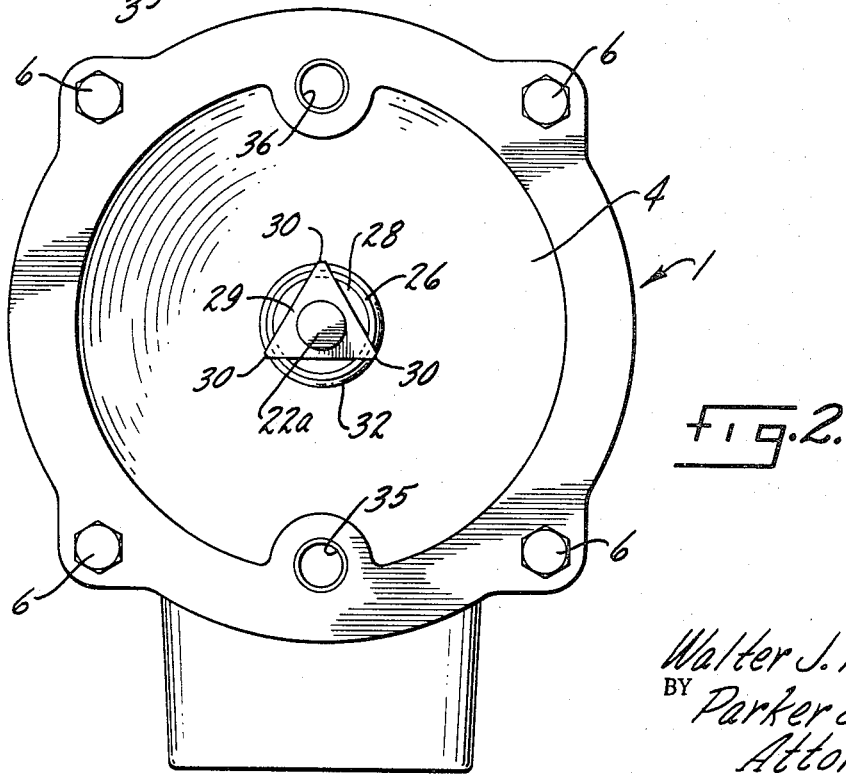
FIGURE 2 is an end view.

As best seen, perhaps, in FIGURE 2, the indicator element 29 has finger portions 30 extending radially through slots 31 in the cup-shaped housing 26 for longitudinal slidable movement therein. While the member 29 is shown as generally triangular in planar configuration, it will be understood that the finger portions 30 could take a variety of forms without departing from the nature and scope of the invention. A ring or endless garter spring 32 surrounds housing 26 in engagement with the outer surface thereof between member 29 and cap 4.

The cap 4 has a pair of threaded apertures 35, 36 extending therethrough and communicating with the chamber A within housing 1, the apertures 35, 36 being available for attachment of various fittings, as desired. For example, a pressure gauge may be fitted into one of said apertures and the other of said apertures may receive a drain, prefill or bleed fitting.

The by-pass valve control spring 27 is out of the flow path of the fluid passing through housing 1 and a relatively unobstructed flow path is provided for such fluid.

While abutment 23 is shown in FIGURE 1, it will be understood that rod or shaft 22 could threadably engage valve element 20 without departing from the nature and scope of the invention.

The structure shown provides a direct external indication of the action and position of by-pass valve 20 and of the condition of the filtering structure therein. No intermediate structure, subject to tampering, maladjustment, etc. is required.

Whereas there has been shown and described a form of structure effective in carrying out the invention, it will be realized that various modifications may be made therein without departing from the nature and scope of the invention. For example, the filter of FIGURE 1 is effective for employment as a suction line filter. The principle of the invention may, for example, be employed, of course, in a return line-type filter wherein various elements not directly related to the invention herein would be revised as required. In the structure shown, a dual filtration is accomplished through first stage filter 9 and second stage filter 13, though the valve and indicator structure of the invention is equally applicable where only filter 13 is employed. Filter 9 may be easily removed and cleaned and filter element 16, the useful life of which is increased by the protection afforded by filter 9, may be formed of a treated, disposable paperlike material, enabling the economical discard and replacement thereof with a new element 13 whenever filter 9 is cleaned.

The use and operation of the invention are as follows:

The fluid to be filtered enters housing 1 through inlet 3 and thereby enters chamber A. In the form of the invention illustrated in FIGURE 1, for example, the fluid having entered chamber A through inlet 3 flows through filter 9 and spaced support legs 8, whereupon the fluid flows through filter element 16 into core 17 and thence the filtered fluid flows outwardly from the filter housing through the outlet 2.

Should an undesirable, predetermined level of contaminants be reached in filter cartridge 13, the fluid to be filtered, being impeded from flowing through element 16, will build up pressure in chamber A sufficient to unseat by-pass valve 20 from its seat 11. With the valve 20 unseated, the fluid is enabled to by-pass filter element 16 and to flow through sleeve 11 past valve 20 and into core 17 and then outwardly of housing 1 through the normal outlet 2.

When by-pass valve 20 was moved off its seat or outwardly from sleeve 11, rod 22 was carried inwardly of housing 1 by valve 20 and head 22a moved indicator member 29 inwardly of indicator housing 26, against the action of spring 27. It will be observed that spring 27 is effective to perform the dual function of retaining valve 20 normally in its seat 11 and of controlling the action of indicator element 29. As indicator element 29 was moved toward cap 4, ring 32 was moved along the outer surface of housing 26. It will be realized that the housing 26 could be suitably colored to indicate the internal condition of the filter structure. For example, a green stripe could be painted on the outer surface of housing 26 adjacent the outer end thereof, and beneath the ring 32 in the position in which it is shown in FIGURE 1. With the ring 32 thus overlying the green stripe, the operator knows that valve 20 is in its seat 11 and the filter is in operating condition. The area adjacent such green stripe in the direction of cap 4 could be painted yellow, of a predetermined width, and thereafter the remaining portion of housing 26 extending toward cap 4 could be painted red. When valve 20 moves out of its normal seated position, as illustrated in FIGURE 1, the ring 32 would thus be moved by fingers 30 along the outer surface of housing 26 to indicate the condition of the filter cartridge 13.

It will be understood that member 28 could be threadably secured to rod 22 and adjusted on rod 22 to adjust the tension of spring 27. It will also be understood that fingers 30, in addition to or instead of moving ring 32, could be suitably elongated to activate an appropriate electrical switch for activation of a visual or audible signal adjacent or remote from the filter housing 1 as the member 29 is moved toward cap 4.

The device is of maximum simplicity in manufacture and assembly. The housing 1 with sleeve 10 which, while shown as separate, might be formed integrally with housing 1, has an open end 5 through which filter members 9 and 13 can be easily inserted, the seal 14 sliding over the inwardly extending sleeve 10 for sealed communication between the core 17 and outlet 2.

The cap 4 carries all of the remaining structure of the invention. Upon seating of the cap 4 in the open end 5 of housing 1, legs 8 support filter element 9 and the sleeve 11, which performs the dual function of sealing the opposite end of core 17, by engagement with seal 15, and forming a seat for valve 20, is merely inserted into seal 15, the entire by-pass valve assembly being carried by cap 4 by means of spaced circumferential legs 12 and the entire indicating assembly being carried by cap 4 as well as the pressure gauge and prefill or drain inlets 35, 36.

The valve 20 serves to seal one end of core 17, to open directly thereinto in response to predetermined forces in chamber A and to actuate indicator element 29.

The structure of the invention is adaptable to employment in association with a wide variety of types of filtering materials and elements. Moreover, the axial indication it provides is effective to produce a visual signal whether the filter housing 1 be positioned adjacent a wall in either the left-to-right position shown or in a right-to-left position. Further, it will be understood that the rod 22 could be provided with a magnetized inward extension into core 17, which extension would acquire minute metal filings and the like which may have passed through element 16.

The indicator structure of the invention is effective to provide an indication of filter condition even when the system with which the filter is associated is at rest, the ring 32 remaining in the indicating position to which it had been moved even after spring 27 returns valve 20 to the position shown in FIGURE 1. For example, rod end 22a or finger member 29 could be arranged to cause a shutdown of the equipment or system with which the invention is employed, upon opening of valve 20 and consequent movement of rod 22 beyond a predetermined point. Following such shutdown, however, ring 32 will remain at the point to which it had been moved by finger member 29, the ring 32 being manually reset after cleaning or replacement of the clogged filter structure.

Should filter element 9 become overcontaminated between cleaning cycles, fluid may reach valve 20 between legs 8 adjacent cap 4. Similarly, if the equipment with which the filter of the invention is employed should be allowed to continue in operation after valve 20 has opened, flange 18a will prevent backflow from core 17 through element 16 and thence through valve 20, flange 19a being provided to insure correct insertion of cartridge 13.

There is claimed:

1. A filter comprising a housing, a chamber within said housing, an inlet passage communicating with said chamber, an outlet passage in said housing, a filter cartridge positioned in said chamber between said inlet and said outlet, said filter cartridge having a hollow core, said outlet communicating with said core, said inlet communicating with the area within said chamber about said cartridge, a cap for said housing, a plurality of circumferentially spaced legs extending inwardly from said cap, a sleeve carried by said legs, said sleeve extending into the opposite end of said filter element core, a valve seated within said sleeve having one side thereof in communication with said inlet and the other side in communication with said core whereby the pressure differential across the cartridge urges said valve out of sealing engagement with said sleeve, a rod carried by said valve and extending outwardly through said cap, a spring carried by and externally of said cap, the outer end of said rod being connected with said spring thereby urging said valve toward sealing engagement with said sleeve, an indicator assembly carried by said cap and having an actuating engagement with said rod whereby movement of said valve off said seat is effective to actuate said indicator assembly, said spring urging elements of said assembly toward non-indicating position, said indicator assembly including elements movable toward said closure in response to movement of said valve off said seat.

2. A filter comprising a housing, a chamber within said housing, an inlet communicating with said chamber, a filter cartridge in said chamber and having a hollow core, an outlet communicating with said core, said inlet being positioned to deliver fluid to said cartridge for filtering passage therethrough into said core and thence outwardly of said housing through said outlet, a cap for said housing, a sleeve carried by said cap, said sleeve penetrating the opposite end of said core from said outlet, a by-pass valve carried by said sleeve having one side thereof in communication with said inlet and the other side in communication with said core whereby the pressure differential across the cartridge urges said valve out of sealing engagement with said sleeve, said valve when opened being effective to communicate the area within said chamber with said core, a rod carried by said valve and extending outwardly through said cap, a yielding member carried by and externally of the rod the outer end of the rod being connected with said yielding member thereby urging said valve toward sealing engagement with said sleeve, and an indicator mechanism carried by said rod and actuatable by said rod outwardly of said cap.

3. A filter including a housing, an outlet in said housing, a hollow boss extending into said housing at said outlet, a filter cartridge having an annular filter element and a hollow core, said core having one of its ends in sealing engagement with said boss and communicating with said outlet through said boss, an inlet in said housing communicating with said annular filter element, said housing having an open end, a closure for said open end, a sleeve carried by said closure, said core having its opposite end in sealing engagement with said sleeve, a valve member carried by said sleeve having one side thereof in communication with said inlet and the other side in communication with said core whereby the pressure differential across the cartridge urges said valve out of sealing engagement with said sleeve, yielding means being carried on the outer surface of said closure, a retainer housing surrounding said yielding means, a rod carried by said valve member and extending through said closure and retainer housing, the outer end of said rod being connected with said yielding means thereby urging said valve member toward sealing engagement with said sleeve, a signal element carried by said retainer housing in actuating engagement with said rod, and signal indicia formed on the outer surface of said retainer housing.

4. A filter including a housing, an outlet in said housing, a hollow boss extending into said housing at said outlet, a filter cartridge having an annular filter element and a hollow core, said core having one of its ends in sealing engagement with said boss and communicating with said outlet through said boss, an inlet in said housing communicating with said annular filter element, said housing having an open end, a closure for said open end, a sleeve carried by said closure, said core having its opposite end in sealing engagement with said sleeve, a valve member carried by said sleeve having one side thereof in communication with said inlet and the other side in communication with said core whereby the pressure differential across the cartridge urges said valve out of sealing engagement with said sleeve, yielding means being carried on the outer surface of said closure, a retainer housing surrounding said yielding means, a rod carried by said valve member and extending through said closure and retainer housing, the outer end of said rod being connected with said yielding means thereby urging said valve member toward sealing engagement with said sleeve, a signal element carried by said retainer housing in actuating engagement with said rod, said signal element comprising a member in sliding frictional engagement with the outer surface of said retainer housing, and radially extending finger elements operable by said rod and engageable with said member to move the same in response to movement of said valve member against the action of said yielding means.

5. A filter assembly comprising a housing, an outlet in said housing, an inlet in said housing, a first annulus surrounding said outlet, a second annulus surrounding said outlet substantially coaxially with said first annulus, a tubular filter screen having one of its ends supported on said first annulus, a filter cartridge having one of its ends supported on said second annulus, a cap for said housing, a plurality of spaced legs carried by said cap and extending into said housing in supporting engagement with the opposite end of said screen, a sleeve carried by said cap and extending into said housing in supporting engagement with the opposite end of said cartridge, a valve carried in seating engagement with said sleeve by said cap, the valve carried by said sleeve having one side thereof in communication with said inlet and the other side in communication with said outlet whereby the pressure differential across the cartridge urges said valve out of sealing engagement with said sleeve, a rod carried by said valve and extending outwardly through said cap, yielding means carried by and externally of said cap member, the outer end of said rod being engaged with said yielding means thereby urging said valve toward sealing engagement with said sleeve.

References Cited

UNITED STATES PATENTS

| | | | |
|---|---|---|---|
| 2,400,200 | 5/1946 | Katcher | 210—130 X |
| 3,000,505 | 9/1961 | Scavazzo | 210—132 X |
| 3,103,952 | 9/1963 | Whiting | 210—90 X |
| 3,150,633 | 9/1964 | Holl | 210—90 X |
| 3,216,571 | 11/1965 | Whiting et al. | 210—90 |
| 3,239,062 | 3/1966 | Rosaen | 210—90 |
| 3,273,715 | 9/1966 | Rosaen | 210—90 |

SAMIH N. ZAHARNA, *Primary Examiner.*